(12) United States Patent
Sutton

(10) Patent No.: US 11,612,256 B2
(45) Date of Patent: Mar. 28, 2023

(54) MAGNETIC HEADBOARDS AND AUTOMOTIVE FLOOR LINERS

(71) Applicant: Rasheina Talese Sutton, San Jose, CA (US)

(72) Inventor: Rasheina Talese Sutton, San Jose, CA (US)

( * ) Notice: Subject to any disclaimer, the term of this patent is extended or adjusted under 35 U.S.C. 154(b) by 0 days.

(21) Appl. No.: 17/465,402

(22) Filed: Sep. 2, 2021

(65) Prior Publication Data

US 2022/0095801 A1 Mar. 31, 2022

Related U.S. Application Data

(60) Provisional application No. 63/111,021, filed on Nov. 7, 2020, provisional application No. 63/198,065, filed on Sep. 26, 2020.

(51) Int. Cl.
*A47C 19/02* (2006.01)
*A47C 31/00* (2006.01)
*B60N 3/04* (2006.01)

(52) U.S. Cl.
CPC .......... *A47C 19/022* (2013.01); *A47C 31/003* (2013.01); *B60N 3/046* (2013.01)

(58) Field of Classification Search
CPC ..... A47C 19/022; A47C 31/003; A47C 19/02; B60N 3/046
See application file for complete search history.

(56) References Cited

U.S. PATENT DOCUMENTS

| 2006/0037135 A1* | 2/2006 | Yang | A47C 19/022 5/53.1 |
| 2020/0037772 A1* | 2/2020 | Schachter | A47C 19/022 |
| 2020/0093266 A1* | 3/2020 | Tristan | A47B 3/06 |

* cited by examiner

*Primary Examiner* — Fredrick C Conley
(74) *Attorney, Agent, or Firm* — Arnold & Porter Kaye Scholer

(57) ABSTRACT

The present disclosure describes methods and apparatus for a modular headboard that is assembled by magnetically coupling of a plurality of magnetic mounting units to one or more magnetic base boards. The present disclosure also describes a set of pre-formed liners designed to maintain the cleanliness of the floor of an automobile, the sheets comprising adhesive regions and, in some embodiments, a textured region on the top surface of the sheets.

30 Claims, 10 Drawing Sheets

FIG. 2
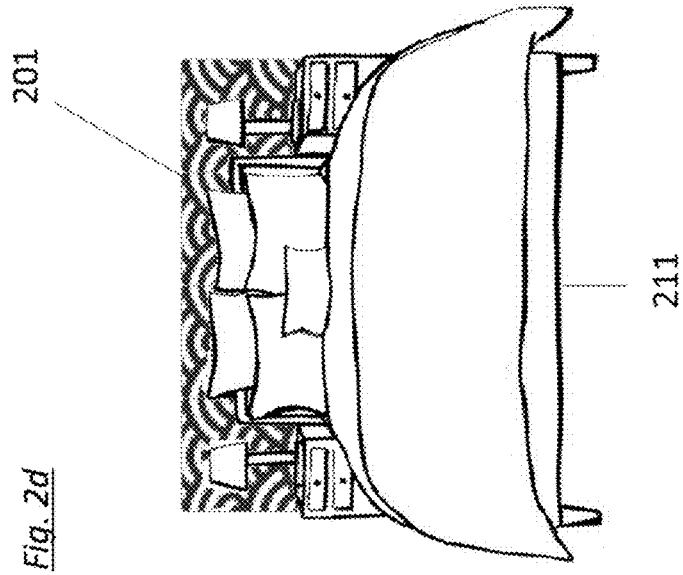
*Fig. 2d*
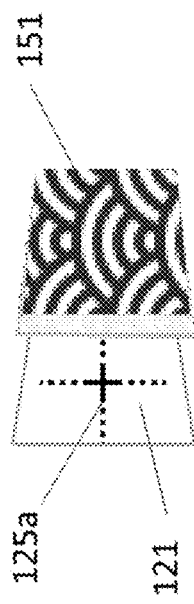
*Fig. 2a*
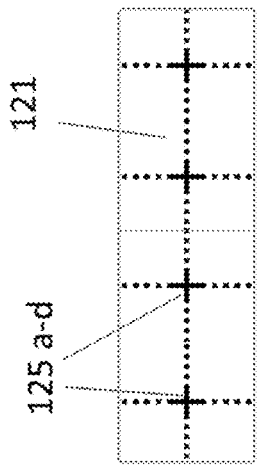
*Fig. 2b*
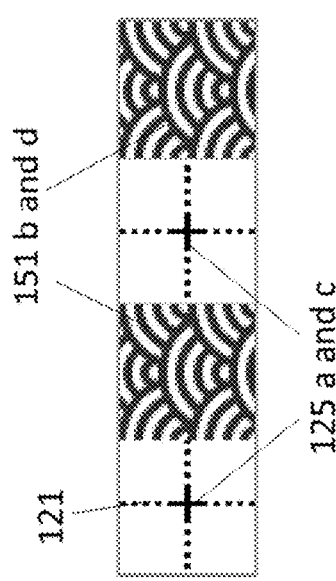
*Fig. 2c*

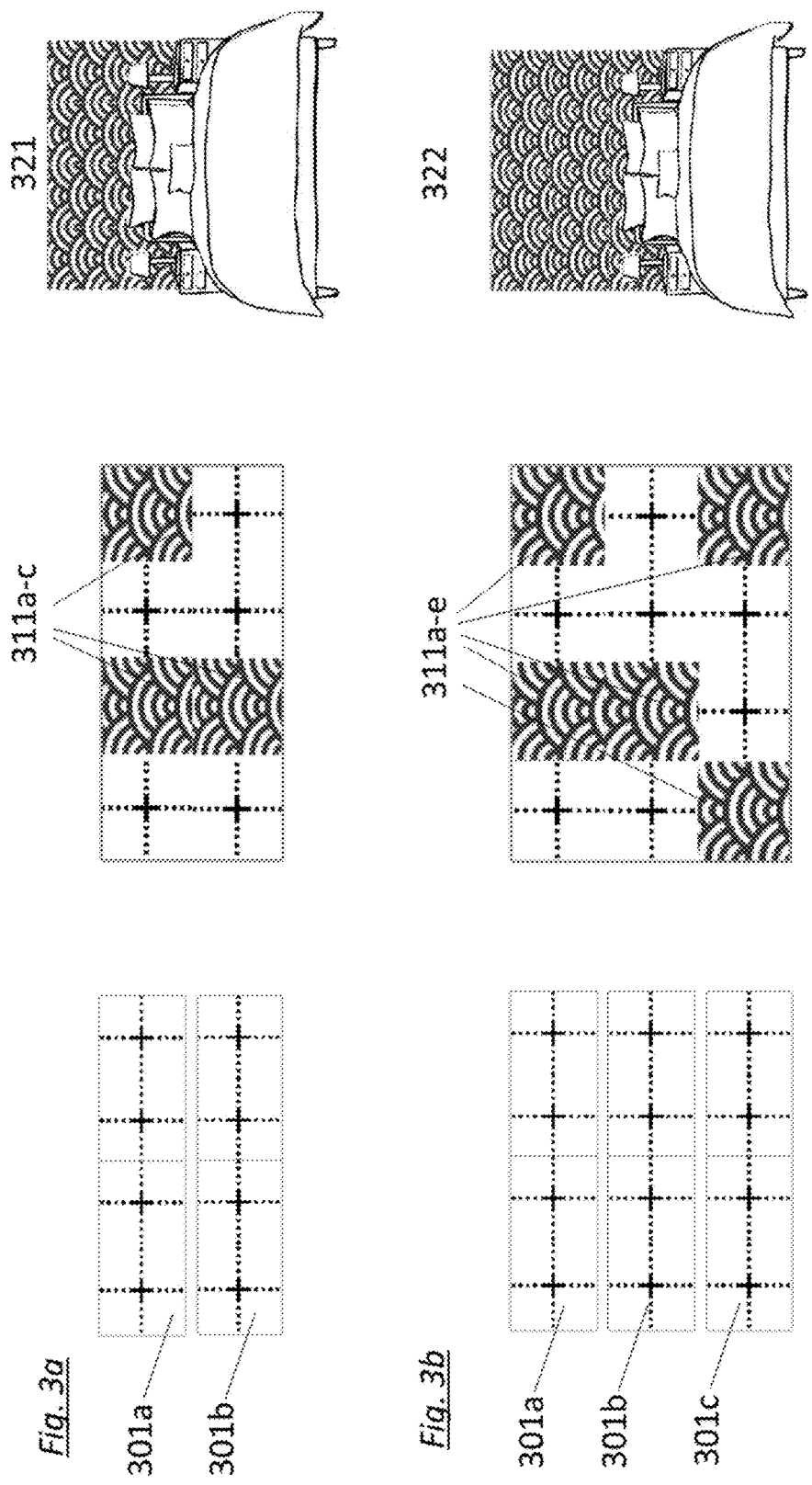

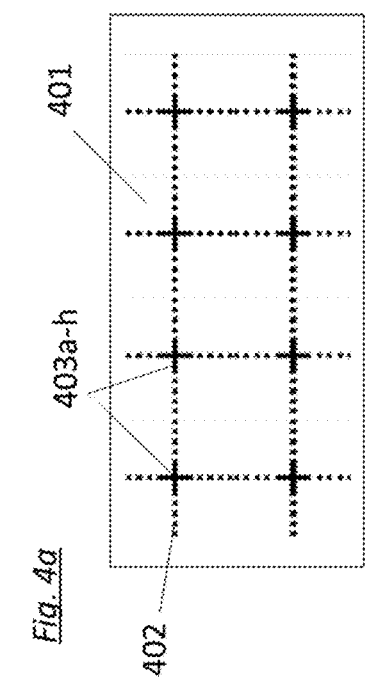

MAGNETIC HEADBOARDS AND AUTOMOTIVE FLOOR LINERS

RELATED APPLICATIONS

This application claims the benefit of U.S. Provisional Patent Application No. 63/111,021, filed on Nov. 7, 2020, and U.S. Provisional Patent Application No. 63/198,065, filed on Sep. 26, 2020. U.S. Provisional Patent Application No. 63/111,021, and U.S. Provisional Patent Application No. 63/198,065 are hereby incorporated by reference in their entirety.

FIELD

The present patent document relates generally to magnetic headboards in which modular magnetic mounting units are magnetically coupled to a base board, which, in turn can be mounted on a wall behind a bed. The present patent document further relates to preformed area liners to maintain the cleanliness of an automobile floor.

BACKGROUND

Current headboards (including headboard for beds and/or wall-mounted backsplashes for interior/exterior decor) are difficult to carry and install. They can become easily damaged and repair is difficult, oftentimes requiring the entire unit to be changed even if only a small portion of the headboard is damaged. Furthermore, current headboards do not allow users to interact with the furniture after purchase (e.g., customizing the design and/or color scheme of the headboard, or change the layout of the headboard). Items are sold in one piece to fit the bed size (single, full, queen, king), and are not easily modifiable. Therefore, customers are required to dispose of the item if there is a need to upgrade or downgrade between different sized headboards. Moreover, other products only offer one design, which is not able to be changed in the future, forcing the user to replace the entire headboard if they wish to have a different aesthetic. These items do not generally break apart easily, and cannot be folded upon disassembly. This means that the currently available products are not easily transported or shipped. Finally, currently available fabric headboards are unable to be removed, making cleaning or sanitizing prohibitively difficult.

Current devices to maintain cleanliness of automobile are simple plastic sheets or paper. They rip, tear, become bunched up and are generally ineffective at maintaining automobile cleanliness. Further, such products do not allow for an easy installation and/or removal of their liners from the vehicle's floor or cargo area. They do not assist with disposing of small particles that are left on the liner, after being used. Users are required to use a vacuum or another product to remove dirt, sand, snow or other small particles, so that even when such products are used, the cleanliness of the automobile is not maintained.

SUMMARY OF THE INVENTION

In one aspect of the present disclosure, a magnetic headboard comprises the following: (a) a base board comprising a planar front board surface and a planar rear board surface, (b) a plurality of mounting units, and (c) a plurality of removable covers. The rear board surface is configured for mounting on a wall. The base board further comprises a plurality of board magnetic regions, and the plurality of board magnetic regions are arranged in regular intervals along a defined pattern. Each of the plurality of mounting units comprise a front unit surface, a rear unit surface, and a unit magnetic region. Each of the plurality of removable covers is shaped to cover one of the plurality of mounting units. The rear unit surface of each of the plurality of mounting units can be magnetically coupled to the front board surface by alignment of the unit magnetic region of each of the plurality of mounting units to a selected one of the plurality of board magnetic regions when each of the plurality of mounting units is coupled to the base board along the defined pattern.

In another embodiment, the board magnetic regions are formed with magnetic material located between the front board surface and the rear board surface.

In another embodiment, the board magnetic regions are formed with magnetic material coupled to the front board surface In another embodiment, the base board is foldable, and the foldable base board comprises a first board portion and a second board portion, the first board portion coupled to the second board portion such that the foldable base board can be reversibly manipulated from an extended state to a folded state following removal of the plurality of mounting units from the foldable base board.

In another embodiment, the shape of each board magnetic region is the same shape and surface area as each of the unit magnetic regions.

In another embodiment, the unit magnetic region for each of the mounting units is cross shaped.

In another embodiment, the front board surface and the rear board surface each have a rectangular shape when the foldable base board is in the extended state.

In another embodiment, the plurality of board magnetic regions are linearly arranged at regular intervals along a line.

In another embodiment, the plurality of board magnetic regions are arranged in regular intervals in a grid.

In another embodiment, the front unit surface and rear unit surface for each of the plurality of mounting units has a rectangular shape.

In another embodiment, the front unit surface and rear unit surface for each of the plurality of mounting units has a square shape.

In another embodiment, the plurality of mounting units is 2 to 16 mounting units and base board comprises the same number of magnetic regions.

In another embodiment, the plurality of mounting units covers the entire front board surface of the base board when each of the plurality of mounting units is magnetically coupled to the base board along the defined pattern.

In another aspect of the present disclosure, a kit for assembling a modular headboard for a bed comprises (a) a foldable base board comprising a first board portion and a second board portion, (b) a plurality of mounting units, and (c) a plurality of removable covers. The first board portion is coupled to the second board portion such that the foldable base board can be reversibly manipulated from an extended state to a folded state and from the folded state to the extended state. In the extended state, the first board portion and the second board portion are in the same plane, and the foldable base board comprises a planar front board surface and a planar rear board surface. The rear board surface is configured for mounting on a wall. The foldable base board further comprises a plurality of board magnetic regions. The plurality of board magnetic regions are arranged in regular intervals along a defined pattern when the foldable base board is in the extended state. Each mounting unit comprising a front unit surface, a rear unit surface, and a unit magnetic region. The rear unit surface is capable of being magnetically coupled to the front board surface when the foldable base board is in the extended state. Each unit magnetic region can be aligned with one of the plurality of the board magnetic regions, thereby magnetically coupling the rear surface of each mounting unit to the front surface of the foldable base board and arranging the plurality of mounting units along the defined pattern. Each removable cover covers one of the plurality of mounting units.

In another embodiment, the board magnetic regions are formed with magnetic material located between the front board surface and the rear board surface.

In another embodiment, the board magnetic regions are formed with magnetic material coupled to the front board surface In another embodiment, the shape of each board magnetic region is the same shape and surface area as each of the unit magnetic regions.

In another embodiment, the unit magnetic region for each of the mounting units is cross shaped.

In another embodiment, the front board surface has a surface area of between 10 and 60 square feet when the foldable base board is in the extended state.

In another embodiment, the plurality of board magnetic regions are linearly arranged at regular intervals.

In another embodiment, the plurality of board magnetic regions are arranged in regular intervals in a grid.

In another embodiment, the front unit surface and rear unit surface for each of the plurality of mounting units has a rectangular shape, and the front unit surface is a curved surface.

In another embodiment, the front unit surface and rear unit surface for each of the plurality of mounting units has a square shape, and the rear unit surface for each of the plurality of mounting units has a surface area of between 1 and 16 square feet.

In another embodiment, the plurality of mounting units is 2 to 16 mounting units and foldable base board comprises the same number of magnetic regions.

In another embodiment, the plurality of mounting units is 4 to 8 mounting units and foldable base board comprises the same number of magnetic regions.

In another aspect of the present disclosure, a floor liner for an automobile floor comprising a liner having a thickness of between 1 and 10 millimeters and comprising a top surface and a bottom surface. The top surface has a surface area between 400 and 3000 square inches. The liner is shaped as an irregular polygon selected from the group consisting of: (a) an irregular hexagon having five interior right angles, (b) an irregular hexagon having five interior right angles and having at least two rounded corners, (c) an irregular octagon having six interior right angles, (d) an irregular octagon having six interior right angles and having at least two rounded corners, and (e) a rectangle having at least two rounded corners. The liner further comprises two or more non-overlapping reversibly adhesive regions on the bottom surface of the liner. The two or more non-overlapping reversibly adhesive regions are located along the perimeter of the liner less than 4 inches from the perimeter of the liner. The two or more non-overlapping reversibly adhesive regions comprise a first adhesive region located less than 4 inches from the edge of a first side of the liner, and a second adhesive region located less than 4 inches of the edge of a second side of the liner, with the first side and second side being different sides of the irregular polygon. The top surface comprises a textured area that occupies at least half of the surface area of the liner. The textured area comprises a textured surface that facilitates capture of particulate matter.

In another embodiment, the liner comprises plastic.

In another embodiment, the liner has a thickness between 2 mm and 5 mm.

In another embodiment, the liner has a thickness of about 4 mm.

In another embodiment, the liner is shaped as an irregular polygon selected from the group consisting of: an irregular hexagon having five interior right angles and the top surface of the liner has a surface area of between 600 and 900 square inches.

In another embodiment, the liner is shaped as a rectangle having at least two rounded corners, and the top surface of the liner has a surface area of between 900 and 1200 square inches.

In another embodiment, the liner is shaped as an irregular polygon selected from the group consisting of: an irregular octagon having six interior right angles, and the top surface of the liner has a surface area of between 1600 and 2200 square inches.

In another embodiment, the liner comprises three or more non-overlapping reversibly adhesive regions that further comprise a third adhesive region located less than 4 inches from the edge of a third side of the liner, the third side being a different side of the irregular polygon than the first and second sides.

In another embodiment, the two or more non-overlapping reversibly adhesive regions comprise a reversible adhesive embedded into the liner.

In another embodiment, the two or more non-overlapping reversibly adhesive regions comprise reversible adhesive strips coupled to the bottom surface of the liner.

In another embodiment, the top surface of the liner comprises a raised lip along the perimeter of the irregular polygon.

In another aspect of the present disclosure, a kit for maintaining the cleanliness of an automobile floor comprises a plurality of floor liners. Each floor liner is shaped as an irregular polygon. Each floor liner has a thickness of between 1 and 10 millimeters and comprising a top surface and a bottom surface. The plurality of floor liners comprises: (a) two floor liners in which the irregular polygon is an irregular hexagon having five interior right angles, the top surface having a surface area of between 600 and 900 square inches; (b) two floor liners in which the irregular polygon is an irregular octagon having six interior right angles, the top surface having a surface area of between 1600 and 2200 square inches; and (c) one floor liner in which the irregular polygon is a rectangle, the top surface having at least two rounded corners having a surface area of between 900 and 1200 square inches. Each floor liner further comprises two or more non-overlapping reversibly adhesive regions on the bottom surface of the floor liner. The two or more non-overlapping reversibly adhesive regions are located along the perimeter of the floor liner less than 4 inches from the perimeter of the floor liner. The two or more non-overlapping reversibly adhesive regions comprise a first adhesive region located less than 4 inches from the edge of a first side of the floor liner, and a second adhesive region located less than 4 inches of the edge of a second side of the floor liner. The first side and second side are different sides of the irregular polygon.

In another embodiment, the liner comprises plastic.

In another embodiment, each floor liner has a thickness between 2 mm and 5 mm.

In another embodiment, each floor liner has a thickness of about 4 mm.

In another embodiment, each floor liner comprises three or more non-overlapping reversibly adhesive regions that further comprise a third adhesive region located less than 4 inches from the edge of a third side of the floor liner, the third side being a different side of the irregular polygon than the first and second sides.

In another embodiment, the two or more non-overlapping reversibly adhesive regions comprise a reversible adhesive embedded into each floor liner.

In another embodiment, the two or more non-overlapping reversibly adhesive regions comprise reversible adhesive strips coupled to the bottom surface of each floor liner.

In another embodiment, the top surface of each floor liner comprises a textured area that occupies at least half of the surface area of the floor liner, the textured area comprising a textured surface that facilitates capture of particulate matter.

In another embodiment, the textured area comprises raised bumps, embedded dimples, or both.

In another embodiment, the textured area comprises raised lines, embedded grooves, or both.

In another embodiment, each floor liner comprises an odor-neutralizing material or scented material.

BRIEF DESCRIPTION OF THE DRAWINGS

FIGS. 2a-2d shows the components of the modular at various stages in assembly including: FIG. 2a showing the front surface 121 of the base board 101 before mounting of any units; FIG. 2b showing the alignment and coupling of one mounting unit 151 to part of the front surface 121 of the base board 101, FIG. 2c showing two of four mounting units 151b and 151d magnetically coupled to the base board, and FIG. 2d showing the fully assembled headboard 201 mounted to a wall behind bed 211.

FIGS. 3a-3b shows the stacking of a plurality of base boards 301 to achieve a larger base. Although the magnetic regions in each base board 301a-c are arranged in a linear configuration, when the base boards 301a-c are stacked, the magnetic regions from the plurality of base boards 301 form a rectilinear grid for attaching mounting units 311.

FIGS. 4a-4d shows a several base boards 401, 411, 421, and 431 comprising magnetic regions arranged in various exemplary patterns, including a rectilinear grid, an off-set rectilinear grid, and a hexagonal grid. FIG. 4 further shows that multiple shapes of mounting units can be used to cover the surface of a single base board 431.

DETAILED DESCRIPTION

Figure 1:
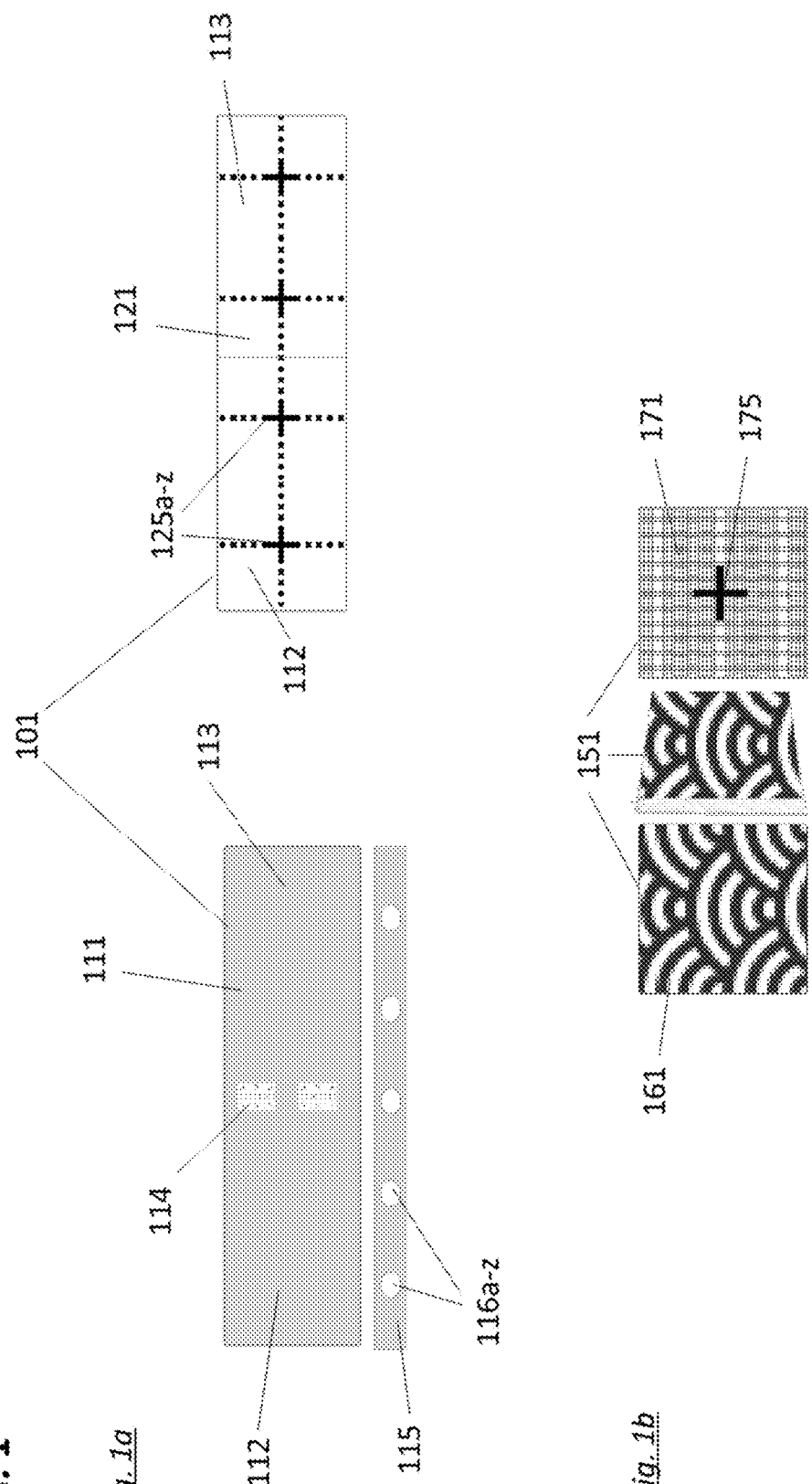
FIGS. 1a-1b shows the components of a modular headboard of the present disclosure. The base board 101 includes rear surface 111, a front surface 121, and in some embodiments, a top and/or bottom edge 115. The base board further comprises a first portion 112 and a second portion 113, joined by, for example, a hinge to allow the base board 101 to be foldable. The components also comprise mounting units 151 that magnetically couple the rear surface 171 of the mounting units to the front surface 121 of the base board via magnetic board regions 125 and magnetic unit regions 175.

The present disclosure describes magnetic headboards that can be mounted to walls. The term "headboard" in the present disclosure is not limited to headboards for use with beds, although such use is included in the term. "Headboards" in the present disclosure includes any decorative or functional unit mounted to a surface (e.g., headboard for bed, decorative backsplashes on wall, padding for ceiling, etc.), and can be used for interior or exterior use. The headboards described herein comprise a base board, mounting units capable of being magnetically coupled to the base board, and in some embodiments, removable covers for the mounting units. In some embodiments, the orientation of the magnetic regions facilitate easy assembly of the final headboard. Furthermore, in some embodiments, the mounting units comprise a fabric cover that can be easily removed thereby allowing easy clean-up and customization of the headboard.

The present disclosure further provides floor liners for automobiles. The automobile floor liners comprise adhesive region(s) on the bottom surface to allow easy installation and a tight fit on the floor. In some embodiments, the top surface comprises a textured surface to facilitate the capturing and retention of particular matter, such as sand, dirt, and snow. In some embodiments, the floor liners are preformed to fit a particular make, model and/or year of automobile. In other embodiments, the floor liners are designed to allow the user to customize the liners to meet their specific needs.

Modular Magnetic Headboards

The present disclosure provides a modular headboard comprising a magnetic base and frame that utilizes magnets to hold mounting units in place on the base, arranged in a predetermined pattern. In some embodiments, when placed together, the mounting units form a design that resembles a headboard size frame. In some embodiments, the mounting units are comprised of a layer fabric on top, followed by cushion, a solid backplate and a magnetic region. The various magnetic regions described herein are formed by using any appropriate magnetic material, for example, ferromagnetic materials, diamagnetic materials, and the like. In some embodiments, the base comprises magnetic regions on the front surface and hinges in the back, for support when the base is folded. In some embodiments, the base can be stacked to form a larger sized headboard. In some embodiments, the present disclosure can be constructed with wood, metal, fabric and any natural or synthetic material without limitation.

The present disclosure solves numerous problems with current headboards, such as difficulty of repair, difficulty of cleaning, inability to customize, and difficulty for transportation. With headboards of the present disclosure, the user is able to easily transport the frame due to its folding nature, which in some embodiments is held together by brackets. In some embodiments, the fabric cover allows the user to switch between many different designs that can be removed for cleaning. Lastly, in some embodiments, multiple bases can be stacked to create a larger size base to reduce the number of disposables from upgrading or downsizing a bed size. Headboards of the present disclosure can also be used in an office or restaurant, as a back splash for the walls or in a booth setting. As long as there is a wall, there are no limitations where the headboards of the present disclosure can be used.

One embodiment of the present disclosure is provided in FIG. 1, which provides the basic components of a magnetic headboard of the present disclosure, including base board 101 and mounting unit 151. As seen in FIG. 1a, the base board 101, comprises a rear board surface 111 and front board surface 121. In some embodiments, the rear board surface is configured for mounting on the wall. In some embodiments, the base board 101 further comprises a first board portion 112 and a second board portion 113, joined by a hinge 114. This allows the base board 101 to be folded in half to facilitate transportation of the components. In some embodiments, the top and/or bottom side 115 of the base board 101 comprises, for example, a plurality of holes 116a-z to facilitate stacking of multiple base boards 101. As shown in FIG. 1, base board 101 further comprises magnetic board regions 125a-z, each of which produces a magnetic field that extends beyond the front board surface 121.

The other basic component of the magnetic headboard is magnetic mounting unit 151, which is designed to be magnetically coupled to base board 101. The mounting unit 151 comprises a front unit surface 161 and rear unit surface 171. In some embodiments, front unit surface 161 comprises a design, portion of a design, or a textured surface. Rear unit surface 171 comprises magnetic unit region 175. Magnetic unit region 175 is used to magnetically couple the rear unit surface 171 of the mounting unit 151 to the front board surface 121 of the base board 101. Magnetic coupling between the mounting unit 151 and the front board surface 121 is reversible (i.e., most users will be able to remove a mounting unit 151 from the base board 101 by simply pulling on the mounting unit 151, without the need for an additional tool or machine. Such reversible magnetic coupling will utilize enough magnetic force to keep mounting unit 151 in place on base board 101, but can be easily removed by the user.

FIG. 2 shows how the components provided in FIG. 1 are assembled to provide one embodiment 201 of the modular magnetic headboard of the present disclosure. FIG. 2a shows the front board surface 121 of a base board comprising four magnetic board regions 125a-d. FIG. 2b shows the coupling of one magnetic board region 125a of front board surface 121 to one mounting unit 151 to the corresponding magnetic unit region (not shown). FIG. 2c shows the magnetic headboard half-way through the assembly process, with two of the four mounting units 151b and 151d magnetically coupled to the front board surface 121 and two magnetic board regions 125a and 125c still exposed. Finally, FIG. 2d shows the completely assembled headboard 201, in which all four mounting units 151 are magnetically coupled to the front board surface 121 of the base board 101 in which the complete headboard is mounted to a wall behind bed 211.

In some embodiments, multiple headboards are stacked top-to-bottom to form a larger final headboard. FIG. 3 shows two exemplarily embodiments of headboards formed by stacking of a plurality of base board units 301. For example, FIG. 3a shows two base boards 301a and 301b stacked top-to-bottom (right), after having three mounting units 311a-c magnetically coupled to the stacked base boards 301a-b (center), and final magnetic modular headboard 321 (right). FIG. 3b shows a similar embodiment formed from the stacking of three base boards 301a-c to form final headboard 322. In some embodiments, the plurality of base boards 301 is configured to stabilize the base boards 301 in a stacked configuration. For example, in some embodiments, the top and/or bottom edges of each of the plurality of base boards 301 comprises a plurality of holes in to which pegs can be inserted to join two base boards, such as for example, the holes 116a-z depicted in FIG. 1. In some embodiments, there the top and/or bottom edges of the base boards 301 comprise grooves and/or ridges that are configured to be complementary (i.e., the ridges of one base board fit into the groove of a second base board and vis versa). Many different configurations are possible to stabilize a plurality of base boards in a stacked configuration, all of which are in within the scope of the present disclosure.

In some embodiments, the base board is foldable, as described above. In other embodiments, the base board is not foldable. For some foldable embodiments, the base board comprises a first board portion and a second board portion, and the first board portion coupled to the second board portion such that the foldable base board can be reversibly manipulated from an extended state to a folded state following removal of the plurality of mounting units from the foldable base board. In some embodiments, the foldable base board folds such that the top surface of the first board portion is in contact with the top surface of the second board portion the foldable base board folds such that the bottom surface of the first board portion is in contact with the bottom surface of the second board portion. In some embodiments, the first board portion and the second board portion are the same size and have the same surface area or nearly the same size and nearly the same surface area. In other embodiments, the first board portion and the second board portion have different sizes and different surface areas. Although in the previous embodiments, the base board folds along a single line, in some embodiments, the base board folds along two or more lines. For example, in some embodiments the base board folds along two lines, and the base board comprises a first board portion, a second board portion, and a third board portion. In some such embodiments, the base board folds such that the top surface of the first board portion is in contact with the top surface of the second board portion, and the bottom surface of the second board portion is in contact with the bottom surface of the third board portion. In other such embodiments, the base board folds such that the bottom surface of the first board portion is in contact with the bottom surface of the second board portion, and the top surface of the second board portion is in contact with the top surface of the third board portion. In some embodiments, the bold folds along for example, 2, 3, 4, 5, 6, or more lines. In some embodiments, the base board folds in e.g., in an accordion fold, a bifold, a trifold, a gate fold, a parallel fold, a double parallel fold, a parallel map fold, or a French fold.

Furthermore, although each of the preceding examples 101 and 301 utilize a base board having magnetic board regions aligned along a single line, the magnetic board regions can be arranged in any number of defined patterns, as shown in FIG. 4. For example, in many embodiments, the magnetic board regions are arranged in a grid. In one such embodiment 401, the magnetic board regions 403a-h are arranged in simple rectilinear grid 402 that is parallel to the edges of, for example, a rectangular base board 401. In other embodiments, such as 411, the magnetic board regions 413a-f are arranged in a simple rectilinear grid that is off-set from the edged of the base board 411, resulting in diagonal grid 412. Such off-set rectilinear grids can be off-set from the edge of the base board 411 by any number of degrees, for example, by 5, 10, 15, 20, 25, 30, 35, 40, 45, etc. degrees. In other embodiments, such as the embodiment 421 shown in FIG. 4c, the magnetic board regions are arranged, for example, as part of a hexagonal grid 422. In the embodiment shown in FIG. 4c, hexagonal mounting units magnetically couples to the base board 421 such that the edges of the hexagonal mounting unit are arranged along hexagonal grid 422. In some embodiments, the magnetic board units 423a-g are shaped as three-pronged stars, and the corresponding magnetic unit regions on the mounting units have the same size and shape. Further, as discussed previously, in some embodiments, the magnetic unit regions are oriented on the hexagonal mounting units such that magnetic coupling of the mounting units to the base board 421 only occurs when the mounting units are oriented according to hexagonal grid 422.

In some embodiments, such as the embodiment disclosed in FIG. 4d, the plurality of mounting units comprises mounting units having two or more shapes. For example, in FIG. 4d, seven different hexagonal mounting units can magnetically couple to first set of magnetic board regions 433a-g. Two trapezoidal mounting units can magnetically couple to second set magnetic board regions 434a-b. Finally, irregular polygonal mounting units can magnetically couple to third magnetic board region 435a-d. Thus, in the embodiment provided in FIG. 4d, three sets of mounting units of different shapes each specifically magnetically couple to one of three sets of magnetic board regions 433, 434, or 435, such that the entire surface of base board 431 is covered by mounting units.

In more general terms, in some embodiments, a modular headboard of the present disclosure comprises a base board, a first set of mounting units, and a second set of mounting units. The base board comprises a front surface that comprises a first set of magnetic board regions having a first shape and a second set of magnetic board regions having a second shape. The rear surface of each of the first set of mounting units comprises a first magnetic unit region and the rear surface of each of the second set of mounting units comprises a second magnetic unit region The shape and surface area of the first magnetic unit region corresponds to the shape and surface area of the first magnetic board region such that there is complete or near complete overlap of the first magnetic board region and the first magnetic unit region when the mounting units are magnetically coupled to the base board. The shape and surface area of the second magnetic unit region corresponds to the shape and surface area of the second magnetic board region such that there is complete or near complete overlap of the second magnetic board region and the second magnetic unit region when the mounting units are magnetically coupled to the base board. In some embodiments, the entire surface of the base board is covered when both the first set of mounting units and the second set of mounting units are magnetically coupled to the base board.

In addition to the lines and grids, base boards having magnetic board regions arranged in many different defined patterns are within the scope of the present disclosure, including, but not limited to, geometric shapes (e.g., rectangle), concentric shapes (e.g. concentric circles), patterns involving two or more off-set lines, zig-zag patterns, wave patterns (e.g., sine or cosine waves), among others readily apparent to one skilled in the art, all of which are within the scope of the present disclosure.

In some embodiments, the spacing between the magnetic board regions is the same for all of the magnetic board regions (i.e., even disbursement of the magnetic board regions along the defined pattern). In some embodiments, there is uneven spacing between the magnetic board regions along the defined pattern. In some such embodiments, the magnetic board regions are separated by two or more different spacings. For example, in some embodiments, the magnetic regions are spaced out by alternating longer and shorter spacings. In some embodiments, the magnetic regions are spaced e.g., 5 feet apart or less, 4.5 feet apart or less, 4 feet apart or less, 3.5 feet apart or less, 3 feet apart or less, 2. 5 feet apart or less, 2 feet apart or less, 1.5 feet apart or less, or 1 foot apart or less.

Figure 5:
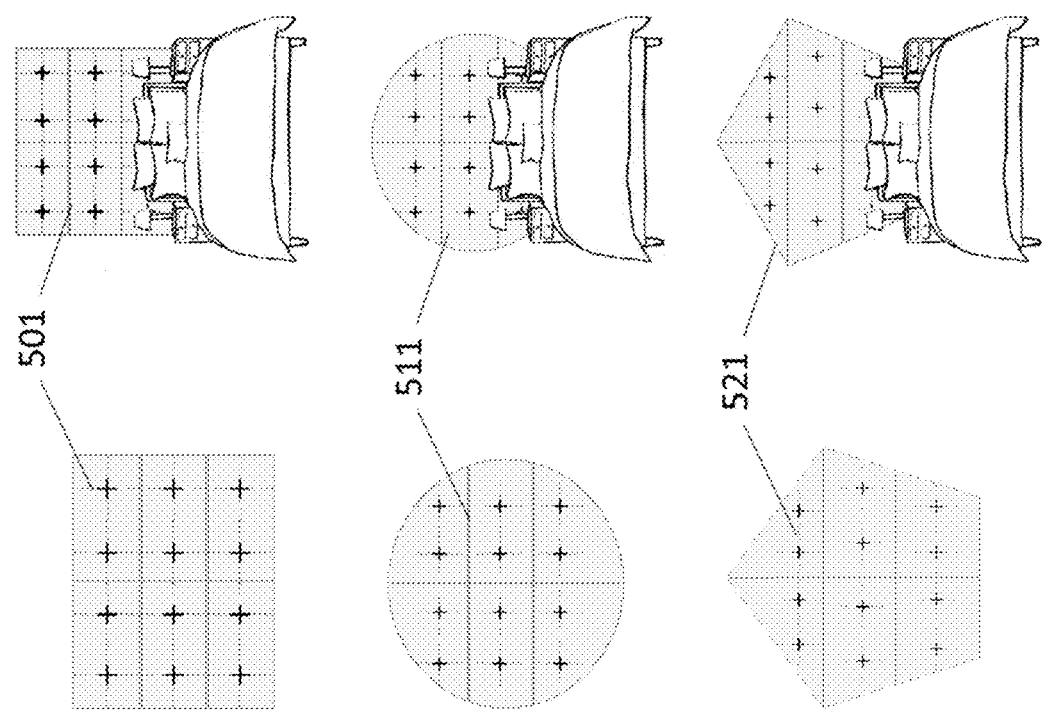
FIG. 5 shows headboards having different shaped base boards, including a square base board 501, circular base board 511, and pentagonal baes board 521.

Although each of the preceding examples 101, 301, 401, 411, 421, and 431 utilize a rectangular base board, other shapes for the base board are within the scope of the present disclosure. For example, in some embodiments, the base board is a regular polygon or an irregular polygon. In some embodiments, the base board is a triangle, a trapezoid, a parallelogram, a pentagon, a hexagon, a heptagon, an octagon, a circle, a semi-circle, a crescent, or other portion of a circle. In some embodiments, the final base is comprised of a plurality of individual base boards. For example, FIG. 5 shows square base board 501, circular base board 511, and pentagonal base board 521. In some embodiments, the final shape is the result of the stacking of one or more individual base boards. For example, in some embodiments, square base board 501 can be formed by the stacking of two or more individual rectangular base board. In some embodiments, a circular base board or a polygonal can be formed by the stacking of two or more individual base boards each comprising a portion of the circle and/or polygon. Many different shapes are possible that are apparent to one of ordinary skill, and all such shapes are within the scope of the present disclosure.

Figure 6:
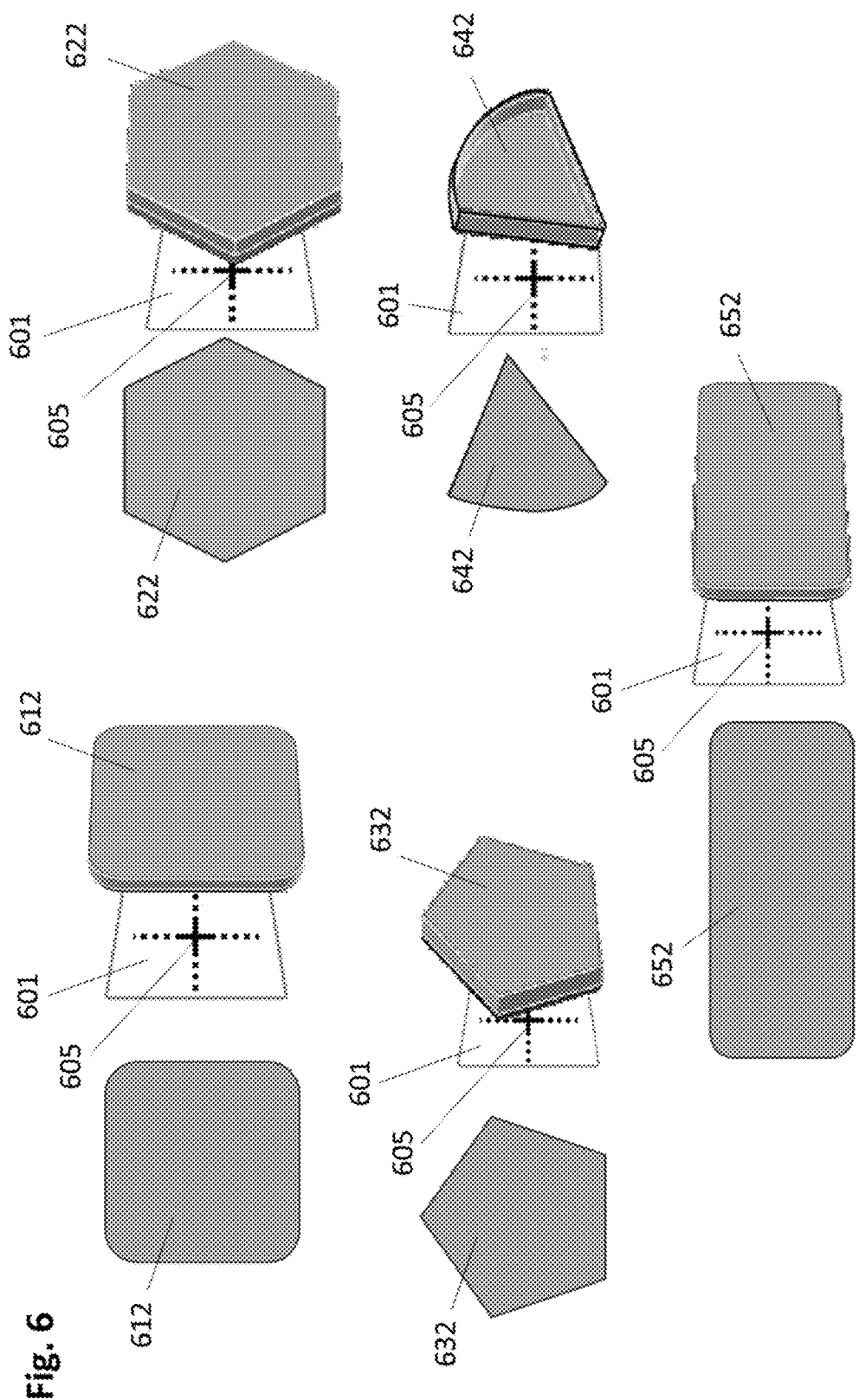
FIG. 6 shows mounting units having different shapes 612, 622, 632, 642, and 652 being placed onto portion of base board 601, including square mounting unit 612, hexagonal mounting unit 622, pentagonal mounting unit 632, curved triangle 642, and rectangular mounting unit 652.

As shown in FIG. 6 and described above, mounting units can also be many different shapes and/or sizes. For example, in some embodiments, such as mounting unit 612, the front surface of mounting unit 612 is square with rounded corners. In some embodiments, such as mounting unit 622, the front surface of mounting unit 622 is hexagonal. In some embodiments, such as mounting unit 632, the front surface of mounting unit 632 is a pentagon. In some embodiments, such as mounting unit 642, the front surface of mounting unit 642 is a triangle with one curved side of the triangle. In some embodiments, such as mounting unit 652, the front surface of mounting unit 652 is rectangular with rounded corners. In some embodiments, each of these mounting units 612, 622, 632, 642, and 652 comprise a cross-shaped magnetic unit region corresponding to magnetic board region 605 on base board 601, thereby facilitating correct placement of the mounting units 612, 622, 632, 642, and 652.

In some embodiments, the mounting units are shaped as regular polygons including, for example, equilateral triangles, squares, regular heptagons, regular hexagons, regular heptagons, or regular octagons, etc. In other embodiments, the mounting units are shaped irregular polygons, including non-equilateral triangles, rectangles, trapezoids, diamonds, irregular pentagons, irregular hexagons, irregular heptagons, or irregular octagons, etc. In some embodiments, the mounting units have at least one rounded edge and are shaped as, for example, circles, half circles, ovals, etc. In some embodiments, the mounting units are each the same shape. In some embodiments, the mounting units comprise two or more shapes listed above. For example, in some such embodiments, half of the mounting units are rectangles, while the other half of the mounting units are squares. In other such embodiments, some of the mounting units are hexagons, while some of the mounting units are pentagons. In some embodiments, the collection of two or more shapes cover the entire surface area of base board 601 when the mounting units are magnetically coupled to the base board 601.

In some embodiments, the front surface of the mounting units is flat. In some embodiments, the front surface of the mounting units is curved. In some embodiments, the front surface of the mounting units is concave. In some embodiments, the front surface of the mounting units is convex. In some embodiments, the front unit surface of the mounting units is parallel to the rear unit surface of the mounting units. In some embodiments, part of or at least part of the front unit surface of the mounting units is parallel to the rear unit surface. In some embodiments, the front unit surface of the mounting units is not parallel to the rear unit surface. In some embodiments, the front surface of the mounting units comprises a cushion.

In some embodiments, the mounting units will fit together so that the entire front surface of the base board (e.g., 101, 301, 431) is covered by mounting units. In some embodiments, all mounting units will fit together such that a continuous area of the base board is covered by the mounting units. In some embodiments, the continuous area comprises a majority of the front board surface of the base board such as, for example, at least 50%, at least 60%, at least 70%, at least 80%, at least 85%, at least 90%, or at least 95% of the front board surface of the base board. In some embodiments, the continuous area covered by the mounting units is the same shape as the base board (e.g., a rectangular base board having a rectangular continuous area). In some embodiments, the continuous area covered by the mounting units is a different shape as the base board. In some embodiments, the mounting units cover two or more continuous areas (e.g., 2, 3, 4, 5, 6, etc. continuous areas). In some such embodiments, the combined area of the two or more continuous areas comprises a majority of the front board surface of the base board such as, for example, at least 50%, at least 60%, at least 70%, at least 80%, at least 85%, at least 90%, or at least 95% of the front board surface of the base board. For example, a modular headboard of the present disclosure could, when fully assembled, have the 80% of the front board surface covered by mounting units, with the mounting units covering two continuous areas.

Magnetic unit regions and/or magnetic board regions can be any number of shapes and still be within the scope of the present disclosure. For example, in some embodiments, the magnetic unit regions and/or magnetic board regions is any regular polygon or irregular polygon. For example, in some embodiments, the magnetic unit regions and/or magnetic board regions is a circle, oval, triangle, rectangle (including square), trapezoid, parallelogram, pentagon, hexagon, heptagon, octagon, etc. In some embodiments, the magnetic unit regions and/or magnetic board regions is cross-shaped, as shown in FIGS. 1 to 4 In some embodiments, the magnetic unit regions and/or magnetic board regions comprises a cross. In some embodiments, the magnetic unit regions and magnetic board regions have the same shape and/or surface area. In some embodiments, the magnetic unit regions and magnetic board regions have different shapes and/or surface areas. In some embodiments, for example, base board 431, the magnetic board region corresponding to a single mounting unit comprises two or more magnetic sub-regions, such as, for example, two or more rectangular magnetic regions (e.g., magnetic board regions 435*a-d* and/or 434*a-b*).

In some embodiments, the shape and placement of magnetic unit regions and/or magnetic board regions are selected to ensure proper placement of the mounting units on the base board along the defined pattern. For example, in FIGS. 1 and 2, the magnetic unit regions 175 and/or magnetic board regions 125 are the same shape (both cross-shaped) and have the same surface area. As seen in FIGS. 1 and 2, the cross-shaped magnetic board regions 125 are oriented such that each arm of the cross is parallel to two edges of the rectangular base board, and the cross-shaped magnetic board regions 175 are oriented such that each arm of the cross is parallel to two edges of the square-shaped of mounting units 161. This configuration forces the mounting units 151 to be arranged such that the edges of the mounting units 151 are parallel to (and in this case, flush with) the edges of the base board 101. This is achieved because sufficient magnetic force is required to magnetically couple the mounting units 151 to the base board 101 and this sufficient magnetic force can only be achieved when there is complete or nearly complete surface overlap between magnetic unit regions 175 and magnetic board regions 125. Thus, for example, in the embodiment provided in FIGS. 1 and 2, the mounting units 151 will only magnetically couple to base board 101 when there is substantial overlap between the magnetic unit regions 175 and magnetic board regions 125, thereby forcing the mounting units 151 to be arranged according to the defined pattern (e.g., the line for FIGS. 1 and 2) set by the orientation and positioning of magnetic board regions 175 For the embodiment shown in FIGS. 1 and 2, this results in the mounting units 151 being arranged in a linear pattern and complete coverage of the front board surface 121 of the base board 101. Similarly, in some embodiments, such as the embodiment provided FIG. 4*d*, the shape and orientation of the three different sets of magnetic board regions 433, 434, and 435 and the corresponding magnetic unit regions (now shown), are designed to facilitate easy assembly by preventing magnetic coupling unless the mounting units are properly placed on the base board 431.

The present disclosure further encompasses other embodiments in which the shape and placement of magnetic unit regions and/or magnetic board regions are selected to ensure proper placement of the mounting units on the base board along a defined pattern. For example, in some embodiments, the magnetic board regions are arranged in a rectilinear grid and cross-shaped with each arm of the cross is parallel to one edge of a square or rectangular base board, similar to that shown in FIGS. 1 and 2, but with two or more lines to form a grid. In such embodiments, the magnetic unit regions are also cross-shaped and oriented with each arm parallel to at least one edge of the mounting unit. In such configurations, the mounting units will only magnetically couple to the base board when there is complete or nearly complete alignment of the magnetic unit regions and magnetic board regions, thereby orienting the mounting units according to the defined pattern (in the embodiment, the grid set forth by the positioning of the magnetic board regions on the base board).

In some embodiments, the mounting units (e.g., mounting units 151) is cushioned. In some embodiments, the mounting units comprise a cushion. In some embodiments, the cushion comprises a cushion foam, feather, hollow fiber, or other natural and/or synthetic cushion fillers. In some embodiments, the cushion foam comprises, for example, polyester fiberfill, medium density polyurethane foam, high density polyurethane foam, open cell foam, closed cell foam, or fabric backed sew foam. Many cushioning materials are known in the art, and all are within the scope of the present disclosure.

In some embodiments, the mounting unit (e.g., mounting units 151) comprises a removable cover. In some embodiments, the removable cover comprises fabric, textile, plastic, rubber, or another natural or synthetic polymer. For example, in some embodiments, the removable cover comprises fabric. In some embodiments, the removable cover comprises cloth. In some embodiments, the removable cover comprises a natural fabric or a synthetic fabric. In some embodiments, the natural fabric comprises, for example, at least one of the following: linen, cotton, hemp, silk, wool, jute, mohair, leather, cashmere, bamboo, or other natural fabrics. In some embodiment, the synthetic fabric comprises, for example, at least one of the following: acetate fiber, acrylic, lyocell, microfiber, nylon, polyester, polypropylene, polyvinyl chloride, rayon, lycra or other synthetic fabrics. In some embodiments, the removable covers are machine washable, facilitating easy cleaning and maintenance. In some embodiments, the removable covers comprise a design located on the portion of the removable cover that covers the front surface of the mounting unit. These removable covers allow the user to easily change the aesthetic of the headboard by simply replacing some or all of the removable covers with new removable covers having different color and/or design. In some embodiments, the removable covers are shaped to match the shape of the mounting unit (e.g., square, rectangular, hexagonal, circular, etc.).

The present disclosure also encompasses kits for assembling modular headboards of the present disclosure. For example, in some embodiments, the kits comprise a base board such as base board 101 and a plurality of mounting units, such as mounting units 151. In some embodiments, the kits further comprise removable covers that are designed to cover the mounting units 151. In some embodiments, the kits further include instructions for the assembly and/or maintenance of the headboard and its components.

Pre-Formed Automobile Floor Liners

The pre-formed automobile floor liners described in this present disclosure comprise a thin removable floor liner that covers large and small areas of a vehicle's floor including the cargo area, to prevent sand, snow, dirt or any other small particles from staying inside the vehicle. The floor liner covers areas that attract small particles that tend to remain whether cleaned or not in the space. In some embodiments, a type of adhesive keeps the sides of the liner in place. Floor liners of the present disclosure can be made, for example, out of plastic, fabric, paper, or any natural and/or synthetic material that allows for reversible adhesion and floor covering without limitation. Floor liners of the present disclosure can be any number of specific shapes, provided they will cover all or part of an automobile floor and/or cargo areas.

The present disclosure solves problems associated with current automobile liners by allowing users to quickly install and remove the liner. When it's removed, the small particles (e.g., sand, dirt) stay on the liner and then can quickly be disposed of. In contrast to prior floor liners, floor liners of the present disclosure will not result in particles being left on the floor or in the cargo areas. Floor liners of the present disclosure will therefore save the user time and money by avoiding the use of a vacuum to remove small particles that were left inside the vehicles upon removal of the floor liner. In some embodiments, the floor liners are trimmable to allow the user to customize the shape and/or size of the floor liner, as automobile floor areas are not consistent in all types of vehicles. In some embodiments, the floor liners are specifically designed to be used with a particular make, model and/or year of automobiles.

Figure 7:
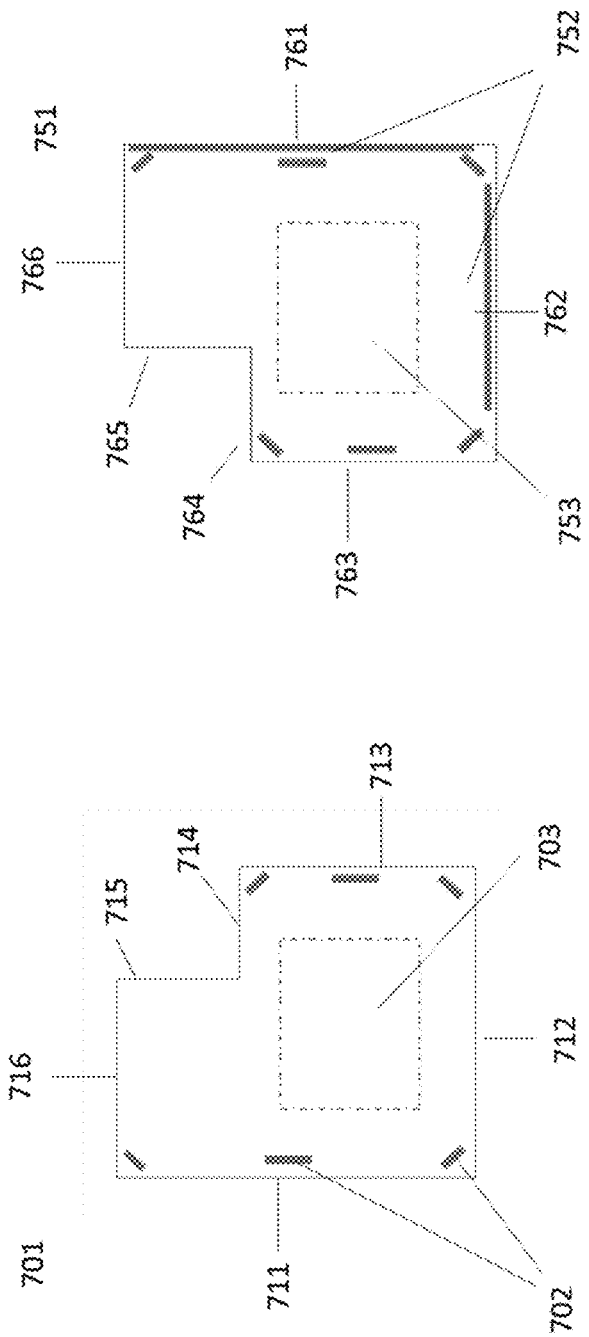
FIG. 7 shows removable area liners 701 and 751 of the present disclosure, shaped to cover the driver's side floor area and passenger side floor area of an automobile.

FIG. 7 depicts two embodiments of the present disclosure, two floor liners 701 and 751 designed to maintain the cleanliness of the driver's side front (701) and the passenger's side front (751). Each of the liners 701 and 751 are shaped as irregular hexagons with six sides 711-716 and 761-766 having five interior right angles. However, such liners may be any irregular polygons having a variety of interior angles. Each of the liners comprises a top surface and a bottom surface, with a textured areas 703 and 753 on the top surface of the liners 701 and 751. The floor liners 701 and 751 each further comprises adhesive regions 702 and 752 on the bottom surface of the liners 701 and 751. In some embodiments, adhesive regions are located near the edge of the liner, for example near the edges 711 and 713 as shown in FIG. 7. In some embodiments, the adhesive regions are located e.g., less than 9 inches, less than 6 inches, less then 5 inches, less than 4 inches, less than 3 inches, less than 2 inches, or less than 1 inch from the edge of the liner (i.e., one side of the irregular polygon). In some embodiments, such as 701, the adhesive regions are relatively small areas, while in other embodiments, the adhesive regions comprise long strips, such as those depicted in liner 751. In some embodiments, the adhesive regions are located within 6, 5, 4, 3, 2, or 1 inch of two or more sides of the irregular polygon, as depicted in liner 701, with adhesive regions proximate to sides 711 and 713. In some embodiments, the adhesive regions are located within 6, 5, 4, 3, 2, or 1 inch of three or more sides of the irregular polygon, as depicted in liner 751, with adhesive regions proximate to sides 761, 762 and 763. In this manner, the adhesive regions are configured to fix liners 701 and 751 to the edges of the driver's and passenger's side front floors, respectively.

In some embodiments, the floor liners of the present disclosure are specifically designed (e.g., shape of the liner, positioning and amount of adhesive, and/or location of the textured area) to be used with a specific make, model, and/or year of automobile. In some embodiments, the adhesive regions of the floor liners are some distance (e.g., 2, 3, 4, 5, 6, 6, 8, 9, 10, 11, 12 inches) from one or more edge of the floor liner, such that the floor liner is "trimmable" (i.e., the user can cut back some or all of the floor liner between the adhesive region(s) and the edge(s) of the floor liner, thereby allowing the user to customize floor coverage to suit their needs).

In some embodiments, the adhesive region in embedded into the floor liner and/or coupled to the floor liner (e.g., double-sided tape). In some embodiment, the adhesive in the adhesive region in embedded into the floor liner. In some embodiments, the adhesive in the adhesive region is coupled to the floor liner. In some embodiments, the adhesive is reversible (i.e., can be removed from a surface without use of additional chemical or mechanical assistance). In some embodiments, the adhesive regions comprise, for example, an acrylic-based adhesive, urethane-based adhesive, epoxy-based adhesive, silicone-based adhesive, rubber-based adhesive, animal glue-based adhesive, or styrene-based adhesives (e.g., styrene block co-polymer).

In some embodiments, the floor liners of the present disclosure comprising a top surface and a bottom surface. In some embodiments, the floor liners of the present disclosure has a thickness of between 0.01 and 20 millimeters. In some embodiments, the floor liners of the present disclosure has a thickness of between 0.01 and 10 millimeters. In some embodiments, the floor liners of the present disclosure has a thickness of between 0.01 and 5 millimeters. In some embodiments, the floor liners of the present disclosure has a thickness of between 0.01 and 1 millimeters. In some embodiments, the floor liners of the present disclosure has a thickness of between 0.1 and 20 millimeters. In some embodiments, the floor liners of the present disclosure has a thickness of between 0.1 and 10 millimeters. In some embodiments, the floor liners of the present disclosure has a thickness of between 0.1 and 5 millimeters. In some embodiments, the floor liners of the present disclosure has a thickness of between 0.1 and 1 millimeters.

Figure 8:
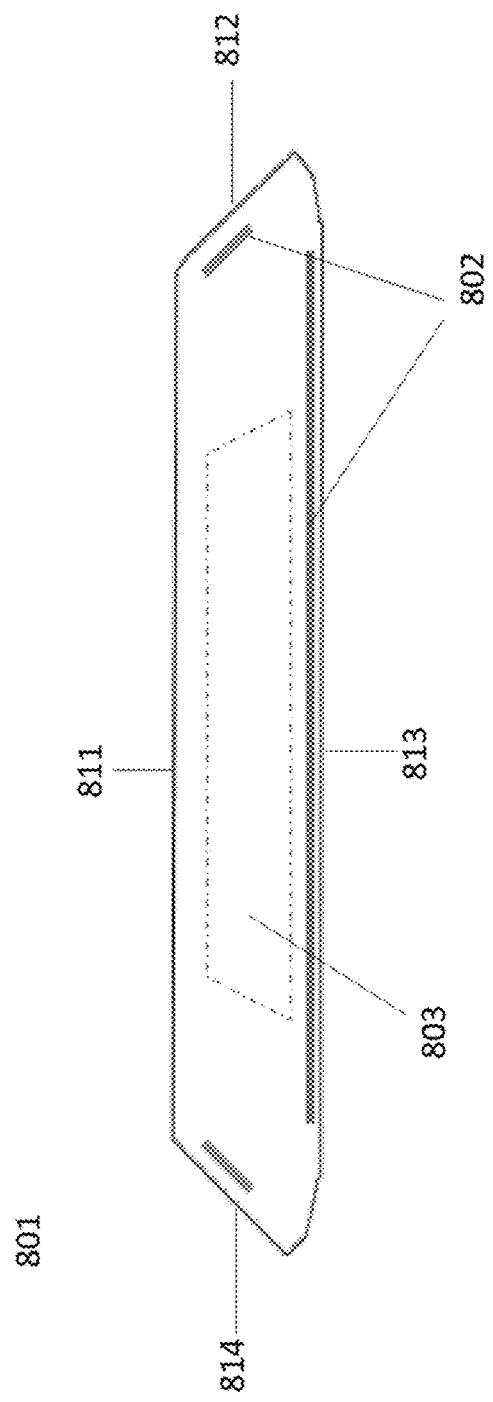
FIG. 8 shows removable area liner 801 of the present disclosure, shaped to cover the rear floor area an automobile.

FIG. 8 depicts one embodiment of the present disclosure, floor liner 801 comprising a top surface and a bottom surface. FIG. 8 shows an angled view of floor liner 801, which is shaped as a rectangle with four sides 811-814 and two rounded corners. The top surface of the floor liner 801 comprises a textured region 803. The bottom surface of the floor liner 801 comprises three adhesive regions 802, each located near the edge of one of three sides 812-814 of the rectangle. In some embodiments, the floor liner 801 is sized and shaped to cover all or a portion of the floor in front of one rear seat of an automobile. In some embodiments, the floor liner 801 is sized and shaped to cover all or a portion of the floor in front of all rear seats of an automobile. As described above, in some embodiments, the adhesive regions are located within 6, 5, 4, 3, 2, or 1 inch of two or more sides of the irregular polygon (i.e., two or more edges of the floor liner 801).

Figure 9:
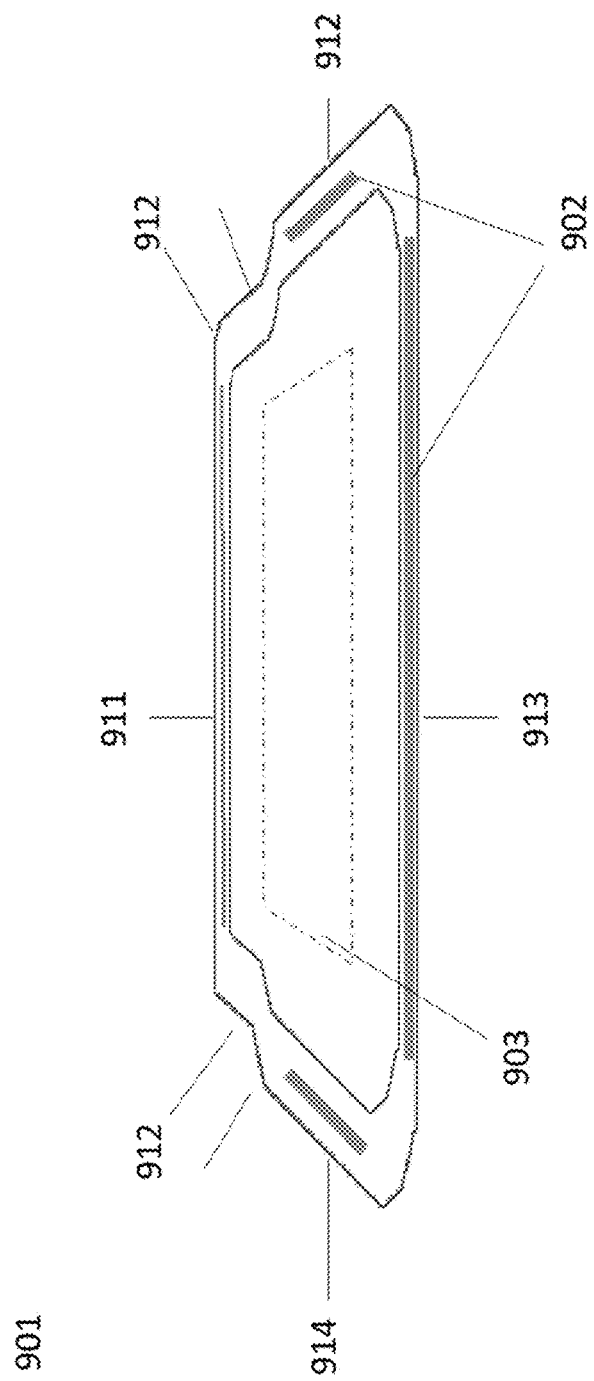
FIG. 9 shows removable area liner 901 of the present disclosure, shaped to cover the trunk and/or cargo area of an automobile.

FIG. 9 shows another embodiment of the present disclosure, floor liner 901 comprising a top surface and a bottom surface. FIG. 9 shows an angled view of floor liner 901, which is shaped as an irregular octagon with eight sides 911-918 having four interior right angles and a plurality of rounded corners. The top surface of the floor liner 901 comprises a textured region 903. The bottom surface of the floor liner 901 comprises four adhesive regions 902, each located near the edge of one of four sides 911, 914, 915, and 916 and of the irregular octagon. In some embodiments, such as the embodiment displayed in FIG. 9, the floor liner 901 is sized and shaped to cover all or a portion of the floor in the rear cargo area and/or trunk area of an automobile.

In some embodiments, the floor liners of the present disclosure has a thickness of between 0.1 and, for example, 0.2 millimeters, 0.3 millimeters, 0.4 millimeters, 0.5 millimeters, 0.6 millimeters, 0.7 millimeters, 0.8 millimeters, 0.9 millimeters, 1 millimeters, 2 millimeters, 3 millimeters, 4 millimeters, 5 millimeters, 6 millimeters, 7 millimeters, 8 millimeters. In some embodiments, the floor liners of the present disclosure has a thickness of between 1 and 6 millimeters. In some embodiments, the floor liners of the present disclosure has a thickness of between 2 and 5 millimeters. In some embodiments, the floor liners of the present disclosure has a thickness of between 2 and 4 millimeters. In some embodiments, the floor liners of the present disclosure has a thickness of, for example, about 0.1 millimeter, about 0.2 millimeters, about 0.3 millimeters, about 0.4 millimeters, about 0.5 millimeters, about 0.6 millimeters, about 0.7 millimeters, about 0.8 millimeters, about 0.9 millimeters, about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, about 11 millimeters, or about 12 millimeters, etc.

In some embodiments, the floor liners of the present disclosure have a thickness of, for example, less than 0.1 millimeter, less than 0.2 millimeter, less than 0.3 millimeter, less than 0.4 millimeter, less than 0.5 millimeter, less than 0.6 millimeter, less than 0.7 millimeter, less than 0.8 millimeter, less than 0.9 millimeter, less than 1 millimeter, less than 2 millimeters, less than 3 millimeters, less than 4 millimeters, less than 5 millimeters, less than 6 millimeters, less than 7 millimeters, less than 8 millimeters, less than 9 millimeters, less than 10 millimeters, less than 11 millimeters, or less than 12 millimeters, etc.

In some embodiments, the floor liners of the present disclosure comprise a top surface and a bottom surface. In some embodiment, the top surface and the bottom surface have the same surface area. In some embodiments, the top surface and the bottom surface have substantially the same surface area. In some embodiments, the top surface and the bottom surface has different surface area. In some embodiments, the top surface has a surface area between 100 and 5000 square inches. In some embodiments, the top surface has a surface area between 100 and 4000 square inches. In some embodiments, the top surface has a surface area between 100 and 3000 square inches. In some embodiments, the top surface has a surface area between 100 and 2000 square inches. In some embodiments, the top surface has a surface area between 100 and 1500 square inches. In some embodiments, the top surface has a surface area between 100 and 1000 square inches. In some embodiments, the top surface has a surface area between 400 and 5000 square inches. In some embodiments, the top surface has a surface area between 400 and 4000 square inches. In some embodiments, the top surface has a surface area between 400 and 3000 square inches. In some embodiments, the top surface has a surface area between 400 and 2000 square inches. In some embodiments, the top surface has a surface area between 100 and 1500 square inches. In some embodiments, the top surface has a surface area between 400 and 1000 square inches.

In some embodiments, the floor liners of the present disclosure are shaped and sized to specifically cover a certain portion of an automobile floor (e.g., front driver's seat floor, front passenger seat floor, rear seat floor, trunk and/or cargo area, etc.). For example, in some embodiments, the floor liner is shaped to cover the front seat (driver's side and/or passenger side) floor of an automobile, for example, by being shaped as an irregular hexagon and having a top surface of such floor liners having a surface area of, for example, between 400 and 1200 square inches, between 500 and 1000 square inches, between 600 and 900 square inches, between 600 and 800 square inches. In some embodiments, the floor liner is shaped to cover the rear passenger seat (driver's side and/or passenger side) floor of an automobile, for example, by being shaped as an rectangle or rectangle with at least two rounded corner and having a top surface of such floor liners having a surface area of, for example, between 400 and 2000 square inches, between 500 and 1500 square inches, between 900 and 1200 square inches, between 400 and 800 square inches, between 1200 and 1800 square inches. In some embodiments, the floor liner is shaped to cover the trunk and/or cargo area floor of an automobile, for example, by being shaped as an irregular octagon and having a top surface of such floor liners having a surface area of, for example, between 1200 and 3000 square inches, between 1400 and 2600 square inches, between 1600 and 2200 square inches, between 1800 and 2000 square inches.

In some embodiments, the floor liner is shaped as an irregular polygon selected from the group consisting of: (a) an irregular hexagon having at least one (e.g., 1, 2, 3, 4) interior right angles; (b) an irregular hexagon having at least one (e.g., 1, 2, 3, 4) interior right angles and having at least two rounded corners; (c) an irregular octagon having at least one (e.g., 1, 2, 3, 4, 5, 6) interior right angles; (d) an irregular octagon having at least one (e.g., 1, 2, 3, 4, 5, 6) interior right angles and having at least two rounded corners; and (e) a four-sided polygon having at least one interior right angle (e.g., 1, 2, 3, 4) and having at least two rounded corners. In some embodiments, the floor liner is shaped as an irregular polygon selected from the group consisting of: (a) an irregular hexagon (including those having at least one rounded or cut corners); (b) an irregular octagon (including those having at least one rounded or cut corners); (c) a four-sided polygon (including those having at least one rounded or cut corners). Floor liners of the present disclosure can be any combination of shapes and sizes disclosed herein.

For ease of discussion and understanding, the term "polygons" (including regular and irregular polygons) and all other shapes (e.g., triangle, rectangle, square, hexagon, octagon, etc.) as used in the present disclosure with respect to floor liners include such shapes and/or polygons having rounded or cut corners). By a polygon having "rounded" or "cut" corners, it is meant that the corners are either rounded (e.g., where two sides of a polygon are joined by a curved edge rather than a single point) or cut (e.g., by a diagonal edge connecting the two sides of the polygon), and that the rounding or cutting is within 10% of the length of each respective side of the polygon. For example, a square having sides of 20 inches each, would still be a "square" within the meaning of the current disclosure if one corner was cut joining two sides of the square by a diagonal line starting 2 or less inches from each respective edge (i.e., such that 2 sides of the square are 18 inches, joined by a diagonal). In some embodiments, the rounded and/or cutting of the corners begins from e.g., less than 6, less than 5, less than 4, less than 3, less than 2, or less than 1 inch from the end of one of the sides. In some embodiments, the rounding of the corners begins from e.g., less than 6, less than 5, less than 4, less than 3, less than 2, or less than 1 inch from the end of one of the sides. Thus, the use of terms to describe geometric shapes encompass those with such minor variations previously discussed, but when such minor variations (e.g., cut or rounded corners) are specifically required, shapes lacking these features are excluded.

Similarly, when the term "right angle" is used in the present disclosure with respect to floor liners, such term encompasses not only 90 degree angles, but also any angles between 80 degree and 100 degree. Thus, a polygon with at least four interior "right angles" in the present disclosure will encompass, for example, a polygon having two 80 degree interior angles and two interior 100 degree angles.

The floor liners of the present disclosure can comprise many different materials which will be apparent to one of ordinary skill in the art. For example, the floor liners can comprise paper, plastic, or rubber. In some embodiments, the floor liners comprise plastic. In some embodiments, the floor liners comprise at least one of the following plastics: polyethylene terephthalate (PET or PETE), polyethylene (PE), high-density polyethylene (HDPE), low-density polyethylene (LDPE), polyvinylidene chloride (PVDC), polyvinyl chloride (PVC), polypropylene (PP), or polystyrene (PS), and derivatives and analogs thereof. In some embodiments, the floor liners comprise a biodegradable plastic. In some embodiments, the floor liners comprise at least one of the following plastics: polyhydroxyalkanoate (PHA), polylactic acid (PLA), polyglycolic acid (PGA), polybutylene succinate (PBS), polycaprolactone (PCL), poly(vinyl alcohol) (PVA), polybutylene adipate terephthalate (PBAT). In some embodiments, the liners comprise a plastic derived from, for example, starch blends, cellulose, or lignin. Many additional plastics are known to those skilled in the art and are within the scope of the present disclosure. In some embodiments, the floor liners comprise paper. In some embodiments, the floor liners comprise cardstock, kraft paper, construction paper, cardboard, bond paper, cotton paper, book paper, bank paper, wax paper, silk paper, including coated derivatives thereof (e.g., wax paper). Many types of paper are known to those skilled in the art and are within the scope of the present disclosure. In some embodiments, the floor liners comprise rubber. In some embodiments, the floor liners comprise natural rubber, neoprene rubber, silicone rubber, nitrile rubber, ethylene propylene diene monomer (EPDM) rubber, styrene-butadiene rubber, butyl rubber, or fluorosilicone rubber. Many types of rubber are known to those skilled in the art and are within the scope of the present disclosure.

In some embodiments, the floor liners of the present disclosure comprise a textured region of top surface of the floor liner. The textured region comprises portions of the liner surface that are not completely smooth and/or planar. For example, in some embodiment, the textured region contains bumps or dimples in the surface, causing deviation from the otherwise smooth and/or planar surface of the liner. In some embodiments, the textured area comprises, for example, raised ridges, raised lines, intended grooves, indented dimples, raised bumps, raised patterns, indented patterns, or a plurality of indented or raised shapes, including but no limited to concentric shapes of raised and/or indented regions. In some embodiments, the textured area comprises two or more textures, for example, a combination of two or more of the following: raised ridges, raised lines, intended grooves, indented dimples, raised bumps, raised patterns, indented patterns, or a plurality of indented or raised shapes, including but no limited to concentric shapes of raised and/or indented regions. Many possibilities for textured regions are possible and are within the scope of the present disclosure.

In some embodiments, the top surface of the floor liner is smooth. In some embodiments, the top surface of the floor liner comprises a texture surface that comprises e.g., at least 10%, at least 20%, at least 30%, at least 40%, at least 50%, at least 60%, at least 70%, at least 80%, or at least 90% of the surface area of the top surface of the floor liner. In some embodiments, the top surface of the floor liner comprises a texture surface that comprises e.g., 10%, 20%, 30%, 40%, 50%, 60%, 70%, 80%, or 90% of the surface area of the top surface of the floor liner. In some embodiments, the top surface of the floor liner comprises a texture surface that covers about half of the surface area of the top surface of the floor liner. In some embodiments, the entire top surface of the floor liner is a textured area. In some embodiments, the floor liners do not comprise a textured region of the top surface of the floor liner.

The floor liners of the present disclosure can be any color. For example, in some embodiments, the floor liners are black, white, yellow, blue, red, brown, green, purple, orange, or any shade thereof. Furthermore, in various embodiments, the floor liners of the present disclosure are clear, opaque, or translucent. In some embodiments, the floor liners comprise two or more colors. In some embodiments, the floor liners are colored such that an image (e.g., picture, drawing, or pattern) is visible on the top surface of the floor liner.

In some embodiments, the floor liners of the present disclosure comprise an odor-neutralizing material. In some embodiments, the odor-neutralizing material comprises, for example, aluminum salts, alum, activated charcoal, and/or magnetism salts). In some embodiments, the odor-neutralizing material comprises an antibacterial. In some embodiment, the floor liners of the present disclosure are scented and/or comprise an aromatic material that provides a particular scent (e.g., perfumes, fragrances, and/or air freshener). For example, in some embodiments, the floor liner comprises e.g., volatile organic compounds such as terpenes (e.g., limonene, alpha-pinene, beta-pinene), terpenoids (e.g., linalool, alpha-terpineol), alcohols, phenols, aromatic derivatives (e.g., benzene, toluene, xylene), heterocyclic derivatives, formaldehyde and derivatives, or phthalates. In some embodiments, the odor-neutralizing and/or scented material is disposed on the top and/or bottom surface of the floor liner. In some embodiments, the odor-neutralizing and/or scented material is embedded within the floor liner.

Figure 10:
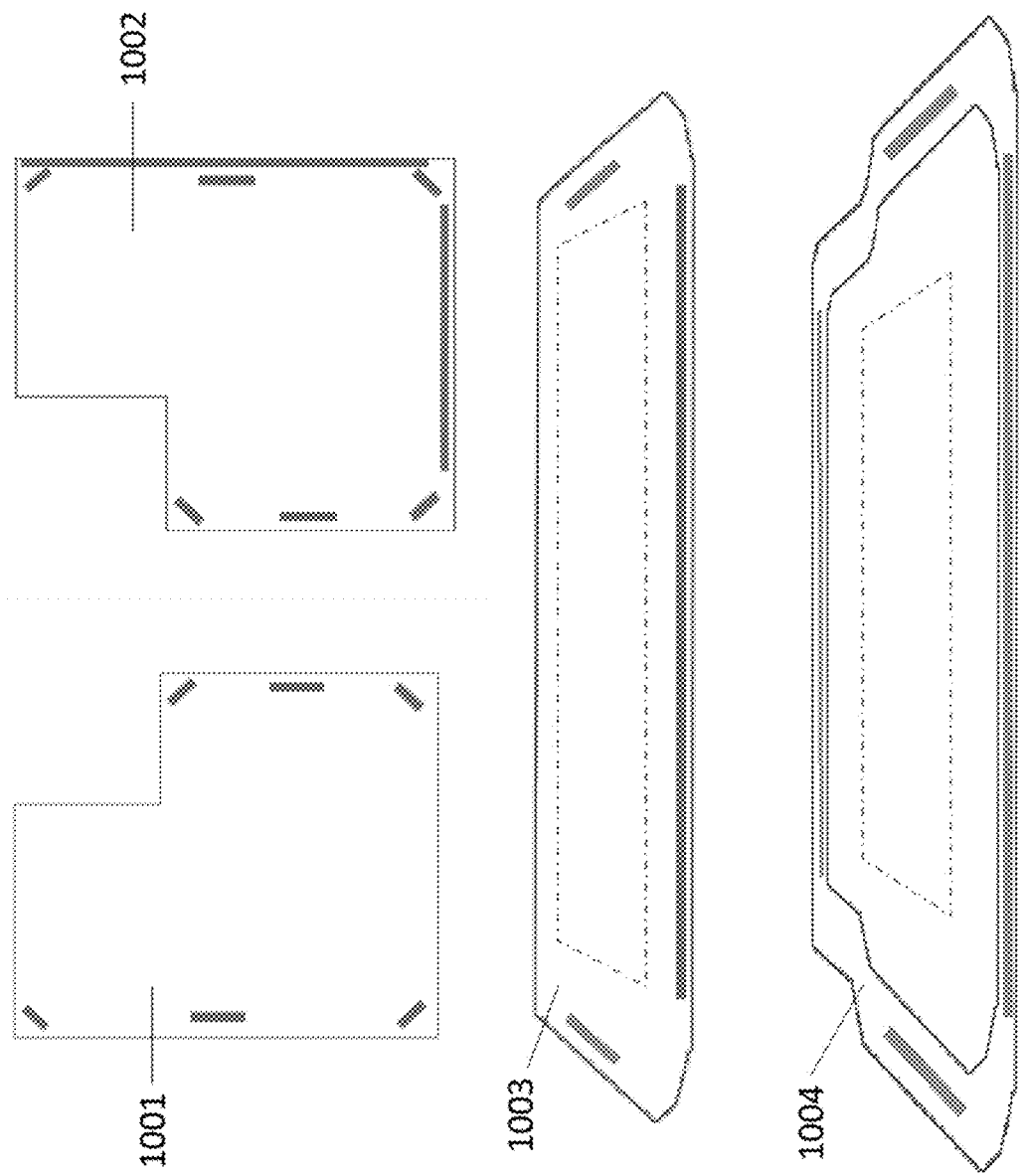
FIG. 10 shows kit 1001 comprising floor liner 716, designed to cover the driver's side front seat floor, floor liner 766, designed to cover the passenger's side front seat floor, floor liner 801, designed to cover at least a portion of the back-seat floor, and floor liner 901, designed to cover at least a portion of the trunk and/or cargo area.

FIG. 10 shows the components of one embodiment of a kit of the present disclosure. In some embodiments, such kits comprise at least one driver's side front seat floor liner 1001, at least one passenger's side front seat floor liner 1002, at least one rear seat floor liner 1003, and at least one cargo area floor liner 1004.

In some embodiments, floor liner 1001 is an irregular hexagon having four interior right angles, floor liner 1002 is an irregular hexagon having four interior right angles, floor liner 1003 is a rectangle comprising at least two rounded corners, and floor liner 1004 is an irregular octagon having six interior right angles. In some embodiments, floor liner 1001 is an irregular hexagon having four interior right angles having a top surface having a surface area of between 600 and 900 square inches, floor liner 1002 is an irregular hexagon having four interior right angles having a top surface having a surface area of between 600 and 900 square inches, floor liner 1003 is a rectangle comprising at least two rounded corners having a top surface having a surface area of between 900 and 1200 square inches, and floor liner 1004 is an irregular octagon having six interior right angles having a top surface having a surface area of between 1600 and 2200 square inches.

In some embodiments, kits of the present disclosure comprise at least three floor liners selected from the group consisting of: (a) floor liner 1001 that is an irregular hexagon having four interior right angles, (b) floor liner 1002 that is an irregular hexagon having four interior right angles, (c) floor liner 1003 that is a rectangle comprising at least two rounded corners, and (d) floor liner 1004 that is an irregular octagon having six interior right angles. In some embodiments, kits of the present disclosure comprise at least three floor liners selected from the group consisting of: (a) floor liner 1001 that is an irregular hexagon having four interior right angles having a top surface having a surface area of between 600 and 900 square inches, (b) floor liner 1002 that is an irregular hexagon having four interior right angles having a top surface having a surface area of between 600 and 900 square inches, (c) floor liner 1003 that is a rectangle comprising at least two rounded corners having a top surface having a surface area of between 900 and 1200 square inches, and (d) floor liner 1004 that is an irregular octagon having six interior right angles having a top surface having a surface area of between 1600 and 2200 square inches.

In some embodiments, kits of the present disclosure comprise at least two of the following: (a) floor liner 1001 that is an irregular hexagon having four interior right angles, (b) floor liner 1002 that is an irregular hexagon having four interior right angles, (c) floor liner 1003 that is a rectangle comprising at least two rounded corners, and (d) floor liner 1004 that is an irregular octagon having six interior right angles. In some embodiments, kits of the present disclosure comprise at least two of the following: (a) floor liner 1001 that is an irregular hexagon having four interior right angles having a top surface having a surface area of between 600 and 900 square inches, (b) floor liner 1002 that is an irregular hexagon having four interior right angles having a top surface having a surface area of between 600 and 900 square inches, (c) floor liner 1003 that is a rectangle comprising at least two rounded corners having a top surface having a surface area of between 900 and 1200 square inches, and (d) floor liner 1004 that is an irregular octagon having six interior right angles having a top surface having a surface area of between 1600 and 2200 square inches.

In some embodiments, kits of the present disclosure comprise at least three floor liners selected from the group consisting of: (a) floor liner 1001 that is an irregular hexagon having four interior right angles, (b) floor liner 1002 that is an irregular hexagon having four interior right angles, (c) floor liner 1003 that is a rectangle comprising at least two rounded corners, and (d) floor liner 1004 that is an irregular octagon having six interior right angles. In some embodiments, kits of the present disclosure comprise at least three floor liners selected from the group consisting of: (a) floor liner 1001 that is an irregular hexagon having four interior right angles having a top surface having a surface area of between 600 and 900 square inches, (b) floor liner 1002 that is an irregular hexagon having four interior right angles having a top surface having a surface area of between 600 and 900 square inches, (c) floor liner 1003 that is a rectangle comprising at least two rounded corners having a top surface having a surface area of between 900 and 1200 square inches, and (d) floor liner 1004 that is an irregular octagon having six interior right angles having a top surface having a surface area of between 1600 and 2200 square inches.

In some embodiments, the kits further comprises packaging that encompasses all floor liners in the kit. In some embodiments, the kits further comprise instructions for application of the floor liners to an automobile floor. In some embodiments, the kits comprise a set of floor liners particularly sized and shaped for a particular make and model of automobile. In some embodiments, the set of floor liners is designed to be trimmable.

The invention claimed is:

1. A modular headboard comprising:
    (a) at least one base board comprising a planar front board surface and a planar rear board surface, the rear board surface being configured for mounting on a wall, and further comprising a plurality of board magnetic regions, the plurality of board magnetic regions arranged in regular intervals along a defined pattern;
    (b) a plurality of mounting units, each of the plurality of mounting units comprising a front unit surface, a rear unit surface, and a unit magnetic region;
    (c) a plurality of removable covers, each of the plurality of removable covers shaped to cover one of the plurality of mounting units; and
    wherein the rear unit surface of each of the plurality of mounting units can be magnetically coupled to the front board surface by alignment of the unit magnetic region of each of the plurality of mounting units to a selected one of the plurality of board magnetic regions when each of the plurality of mounting units is coupled to the base board along the defined pattern; and wherein said plurality of mounting units are capable of covering the entire surface area of said at least one base board.

2. The modular headboard of claim 1, wherein the board magnetic regions are formed with magnetic material located between the front board surface and the rear board surface.

3. The modular headboard of claim 1, wherein the board magnetic regions are formed with magnetic material coupled to the front board surface.

4. The modular headboard of claim 1, wherein the base board is foldable, and wherein the foldable base board comprises a first board portion and a second board portion, the first board portion coupled to the second board portion such that the foldable base board can be reversibly manipulated from an extended state to a folded state following removal of the plurality of mounting units from the foldable base board.

5. The modular headboard of claim 1, wherein the shape of each board magnetic region is the same shape and surface area as each of the unit magnetic regions.

6. The modular headboard of claim 5, wherein the unit magnetic region for each of the mounting units is cross shaped.

7. The modular headboard of claim 1, wherein the front board surface and the rear board surface each have a rectangular shape.

8. The modular headboard of claim 1, wherein the plurality of board magnetic regions are linearly arranged at regular intervals along a line.

9. The modular headboard of claim 1, wherein the plurality of board magnetic regions are arranged in regular intervals in a grid.

10. The modular headboard of claim 1, wherein the front unit surface and rear unit surface for each of the plurality of mounting units has a rectangular shape.

11. The modular headboard of claim 10, wherein the front unit surface and rear unit surface for each of the plurality of mounting units has a square shape.

12. The modular headboard of claim 1, wherein the plurality of mounting units is 2 to 16 mounting units and the base board comprises the same number of magnetic regions.

13. The modular headboard of claim 1, wherein the plurality of mounting units covers the entire front board surface of the base board.

14. The modular headboard of claim 1, wherein said at least one base board comprises two or more baseboards.

15. The modular headboard of claim 1, wherein said at least one base board comprises three or more baseboards.

16. The modular headboard of claim 1, wherein said plurality of mounting units extend from the front surface of the baseboard.

17. A kit for assembling a modular headboard for a bed comprising
(a) a foldable base board comprising at least a first board portion and a second board portion, the first board portion coupled to the second board portion such that the foldable base board can be reversibly manipulated from an extended state to a folded state and from the folded state to the extended state,
wherein in the extended state, the first board portion and the second board portion are in the same plane, and the foldable base board comprises a planar front board surface and a planar rear board surface, the rear board surface being configured for mounting on a wall,
wherein the foldable base board further comprises a plurality of board magnetic regions, the plurality of board magnetic regions arranged in regular intervals along a defined pattern when the foldable base board is in the extended state; and
(b) a plurality of mounting units, each mounting unit comprising a front unit surface, a rear unit surface, and a unit magnetic region,
wherein the rear unit surface capable of being magnetically coupled to the front board surface when the foldable base board is in the extended state,
wherein each unit magnetic region can be aligned with one of the plurality of the board magnetic regions, thereby magnetically coupling the rear surface of each mounting unit to the front surface of the foldable base board and arranging the plurality of mounting units along the defined pattern,
wherein said plurality of mounting units are capable of covering the entire surface area of said foldable base board; and
(c) a plurality of removable covers, each removable cover covering one of the plurality of mounting units.

18. The kit of claim 17, wherein said plurality of mounting units extend from the front surface of the baseboard.

19. The kit of claim 17, wherein the front board surface has a surface area of between 10 and 60 square feet when the foldable base board is in the extended state.

20. The kit of claim 17, wherein the plurality of board magnetic regions are linearly arranged at regular intervals.

21. The kit of claim 17, wherein the plurality of board magnetic regions are arranged in regular intervals in a grid.

22. The kit of claim 17, wherein the front unit surface and rear unit surface for each of the plurality of mounting units has a rectangular shape, and the front unit surface is a curved surface.

23. The kit of claim 22, wherein the front unit surface and rear unit surface for each of the plurality of mounting units has a square shape, and the rear unit surface for each of the plurality of mounting units has a surface area of between 1 and 16 square feet.

24. The kit of claim 17, wherein the plurality of mounting units is 2 to 16 mounting units and foldable base board comprises the same number of magnetic regions.

25. The kit of claim 24, wherein the plurality of mounting units is 4 to 8 mounting units and foldable base board comprises the same number of magnetic regions.

26. The kit of claim 17, further comprising a third board portion.

27. The modular headboard of claim 17, wherein the board magnetic regions are formed with magnetic material located between the front board surface and the rear board surface.

28. The modular headboard of claim 17, wherein the board magnetic regions are formed with magnetic material coupled to the front board surface.

29. The kit of claim 17, wherein the shape of each board magnetic region is the same shape and surface area as each of the unit magnetic regions.

30. The kit of claim 29, wherein the unit magnetic region for each of the mounting units is cross shaped.

* * * * *